US008703847B2

(12) United States Patent
Wright

(10) Patent No.: US 8,703,847 B2
(45) Date of Patent: Apr. 22, 2014

(54) GLYOXALATION OF VINYLAMIDE POLYMER

(75) Inventor: Matthew D. Wright, Smithfield, VA (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/524,741

(22) Filed: Jun. 15, 2012

(65) Prior Publication Data
US 2012/0247699 A1 Oct. 4, 2012

Related U.S. Application Data

(62) Division of application No. 12/969,783, filed on Dec. 16, 2010, now Pat. No. 8,222,343, which is a division of application No. 11/895,923, filed on Aug. 28, 2007, now Pat. No. 7,875,676.

(60) Provisional application No. 60/843,156, filed on Sep. 7, 2006, provisional application No. 60/851,188, filed on Oct. 12, 2006.

(51) Int. Cl.
B29C 47/00 (2006.01)

(52) U.S. Cl.
USPC .............................. 524/13; 524/14; 525/54.23

(58) Field of Classification Search
USPC .................................. 524/13, 14; 525/54.23
See application file for complete search history.

(56) References Cited

U.S. PATENT DOCUMENTS

| 3,556,392 A | 1/1971 | Robin |
| 3,556,932 A | 1/1971 | Coscia et al. |
| 3,580,736 A | 5/1971 | Moyer et al. |
| 3,728,214 A | 4/1973 | Espy |
| 3,759,197 A | 9/1973 | Bracke |
| 4,103,742 A | 8/1978 | Swanson |
| 4,144,123 A | 3/1979 | Scharf et al. |
| 4,155,405 A | 5/1979 | Vio |
| 4,217,425 A | 8/1980 | Ballweber et al. |
| 4,421,602 A | 12/1983 | Brunnmueller et al. |
| 4,506,062 A | 3/1985 | Flesher et al. |
| 4,528,321 A | 7/1985 | Allen et al. |
| 4,599,379 A | 7/1986 | Flesher et al. |
| 4,603,176 A | 7/1986 | Bjorkquist et al. |
| 4,605,702 A | 8/1986 | Guerro et al. |
| 4,673,704 A | 6/1987 | Flesher et al. |
| 4,954,538 A | 9/1990 | Dauplaise et al. |
| 5,037,927 A | 8/1991 | Itagaki et al. |
| 5,041,503 A | 8/1991 | Dauplaise et al. |
| 5,085,787 A | 2/1992 | Pinschmidt, Jr. et al. |
| 5,281,307 A | 1/1994 | Smigo et al. |
| 5,290,880 A | 3/1994 | Moench et al. |
| 5,320,711 A | 6/1994 | Dauplaise et al. |
| 5,374,334 A | 12/1994 | Sommese et al. |
| 5,723,022 A | 3/1998 | Dauplaise et al. |
| 5,863,879 A | 1/1999 | Zirnstein et al. |
| 6,001,920 A | 12/1999 | Ghafoor et al. |
| 6,031,037 A | 2/2000 | Ghafoor et al. |
| 6,159,340 A | 12/2000 | Niessner et al. |
| 6,576,086 B1 | 6/2003 | Ettl et al. |
| 6,616,807 B1 | 9/2003 | Dyllick-Brenzinger et al. |
| 6,797,785 B1 | 9/2004 | Hund et al. |
| 6,824,659 B2 | 11/2004 | Bayley et al. |
| 7,034,068 B1 | 4/2006 | Negele et al. |
| 7,090,745 B2 | 8/2006 | Beckman et al. |
| 7,482,417 B2 | 1/2009 | Kiyosada et al. |
| 7,875,676 B2 * | 1/2011 | Wright ..................... 525/54.23 |
| 8,222,343 B2 * | 7/2012 | Wright ..................... 525/54.23 |
| 2004/0118540 A1 | 6/2004 | Garnier et al. |
| 2005/0161181 A1 | 7/2005 | St. John et al. |
| 2005/0187356 A1 | 8/2005 | Hagiopol et al. |
| 2006/0016906 A1 | 1/2006 | Matsumoto |
| 2006/0065380 A1 | 3/2006 | Garnier et al. |
| 2006/0162886 A1 | 7/2006 | Smith et al. |
| 2008/0064819 A1 | 3/2008 | Wright |
| 2011/0083821 A1 | 4/2011 | Wright |

FOREIGN PATENT DOCUMENTS

| DE | 4413720 | 10/1995 |
| EP | 0102760 A2 | 3/1984 |
| EP | 0126528 A2 | 11/1984 |
| EP | 0150933 A2 | 8/1985 |
| EP | 0170394 A2 | 2/1986 |
| GB | 1576447 A | 10/1980 |
| JP | Sho 40-024926 | 10/1965 |
| JP | 2003-238631 A | 8/2003 |
| WO | WO-95/29221 | 11/1995 |
| WO | WO-9831748 A1 | 7/1998 |
| WO | WO-9831749 A1 | 7/1998 |

(Continued)

OTHER PUBLICATIONS

Search Report dated May 9, 2007, issued in Chilean Application No. 2581-07.
International Search Report mailed Jul. 11, 2008, in International Application No. PCT/EP2007/059096 filed Aug. 31, 2007.
Search Report dated Feb. 7, 2007, issued in British Application No. GB0620842.5.
Examiner's First Report issued by the Australian Patent Office on Australian Patent Application No. 2007293922 dated May 7, 2012.
First Office Action (English translation) issued Aug. 20, 2010 by the Chinese Patent Office in Chinese Patent Application No. 200780033236.3.
Second Office Action (English translation) dated Mar. 29, 2011, issued by the Chinese Patent Office in Chinese Patent Application No. 200780033236.3.

(Continued)

Primary Examiner — Edward Cain
(74) Attorney, Agent, or Firm — Drinker Biddle & Reath

(57) ABSTRACT

The present invention is directed to a method for preparing a cellulose reactive adduct of polyvinylamide and a composition resulting from the method. The preparation of the cellulose reactive adduct is carried out close to a Critical Concentration defined herein. When the reaction is run close to this Critical Concentration, the risk of gelation is minimized, consumed glyoxal is maximized, and shelf live is enhanced. Additionally, the glyoxalated vinylamides of the present invention impart improved wet and dry strengthening efficiency to paper and paperboard when compared to adducts disclosed in previously described art.

18 Claims, No Drawings

(56) References Cited

FOREIGN PATENT DOCUMENTS

| WO | WO-0011046 A1 | 3/2000 |
|---|---|---|
| WO | WO-2006016906 A1 | 2/2006 |
| WO | WO-2006102059 A2 | 9/2006 |

OTHER PUBLICATIONS

Third Office Action (English translation) dated Sep. 8, 2011, issued by the Chinese Patent Office in Chinese Patent Application No. 200780033236.3.

Fourth Office Action (English translation) dated Jan. 12, 2012, issued by the Chinese Patent Office in Chinese Patent Application No. 200780033236.3.

First Office Action (English translation) issued Aug. 12, 2013 by the Chinese Patent Office in Chinese Patent Application No. 201110281485.2.

First Office Action issued Jul. 3, 2013 by the Canadian Intellectual Patent Office in Canadian Patent Application No. 2,661,967.

First Substantive Report issued Dec. 22, 2010, in Chilean Patent Application No. 2581-2007.

Second Substantive Report issued Oct. 3, 2011, by the Chilean Patent Office in Chilean Patent Application No. 2581-2007.

Third Substantive Report issued Apr. 10, 2013, by the Chilean Patent Office in Chilean Patent Application No. 2851-2007.

Rejection (English translation) issued May 28, 2013, by the Japanese Patent Office in Japanese Patent Application No. 2009-527120.

Rejection (English translation) issued Sep. 17, 2013, by the Japanese Patent Office in Japanese Patent Application No. 2009-527120.

International Search Report mailed Nov. 7, 2008, in International Application No. PCT/EP2007/059096.

International Search Report mailed Jun. 10, 2008, in International Application No. PCT/EP2007/059096.

International Preliminary Report on Patentability and Written Opinion issued Mar. 10, 2009, by the WIPO in International Application No. PCT/EP2007/059096.

Communication Jul. 15, 2009, by the European Patent Office in European Patent Application No. 07 803 101.0-2109.

Communication Feb. 1, 2010, by the European Patent Office in European Patent Application No. 07 803 101.0-2109.

Communication Jun. 18, 2010, by the European Patent Office in European Patent Application No. 07 803 101.0-2109.

Communication May 10, 2012, by the European Patent Office in European Patent Application No. 11 173 863.9-2109.

Communication Feb. 1, 2013, by the European Patent Office in European Patent Application No. 11 173 863.9-2109.

Communication May 9, 2012, by the European Patent Office in European Patent Application No. 11 173 866.2-2109.

Communication Feb. 1, 2013, by the European Patent Office in European Patent Application No. 11 173 866.2-2109.

\* cited by examiner

GLYOXALATION OF VINYLAMIDE POLYMER

CROSS-REFERENCE TO RELATED APPLICATIONS

This application is a divisional of U.S. Ser. No. 12/969,783, filed Dec. 16, 2010, which is a divisional of U.S. Ser. No. 11/895,923, filed Aug. 28, 2007, now U.S. Pat. No. 7,875, 676, which claims the benefit of U.S. Provisional Application Nos. 60/843,156, filed on Sep. 7, 2006 and 60/851,188, filed Oct. 12, 2006, and which are incorporated by reference herein in their entirety.

FIELD OF THE INVENTION

The present invention is directed to a method for preparing a cellulose reactive adduct of polyvinylamide and a composition resulting from the method.

The polyvinylamide cellulose reactive adduct obtained by the process of the invention is used as dry and wet strength aid for paper or board and may be applied to cellulose in the wet end or applied directly to a wet web paper or board.

BACKGROUND OF THE INVENTION

The use of synthetic water-soluble polymers as wet end additives for the strengthening of paper and paperboard is widely practiced. The use of cellulose reactive water-soluble vinylamide copolymers as paper strengthening agents is also common. One particular class of vinylamide polymer strength aids includes vinylamide polymers which are modified with glyoxal or cellulose reactive agents in such a way as to be thermosetting.

U.S. Pat. No. 3,556,392 describes the synthesis of glyoxal-reacted water-soluble vinylamide polymers used as paper strength agents. The vinylamide polymers can contain ionic comonomers or other comonomers which impart specific functionalities to the polymers to improve affinity to cellulose. The backbone vinylamide polymer is reacted with enough glyoxal to form a thermosetting adduct. The reaction is catalyzed by raising the pH of the reaction solution to approximately 8, and when a slight increase in solution viscosity is noted the pH is lowered to approximately 7 to slow the progress of the reaction. When a predetermined viscosity target is reached, the reaction is quenched by lowering the pH to approximately 3.5 to 4. The degree of functionalization of the vinylamide polymer with glyoxal is monitored by measuring the increase in viscosity of the reaction solution using Gardner-Holdt bubble viscometers. U.S. Pat. No. 3,556,392 teaches that following the final acid quench, when the desired extent of reaction has been reached, approximately half of the original glyoxal remains unreacted in the finished product and does not function as a strength aid.

U.S. Pat. No. 3,556,392 teaches the prior art finished product will form an insoluble gel when aged for 8 days at 73° F. and at a concentration of 9 percent solids.

U.S. Pat. No. 4,217,425 discloses a strength aid made from an aqueous blend of acrylamide homopolymer, polyDAD-MAC (polydiallyldimethyl ammonium chloride) and glyoxal. The reaction mixture is catalyzed by invoking mildly alkaline conditions and the solution viscosity is monitored until a predetermined increase in viscosity has been reached; at which time the reaction is "killed" by lowering the pH to approximately 4. In example 1 from U.S. Pat. No. 4,217,425, acrylamide polymer, DADMAC polymer and glyoxal are mixed in solution under alkaline conditions. After 360 minutes the solution viscosity is measured as 17 cps, after 400 minutes the viscosity is 32 cps and after 415 minutes the viscosity is 55 cps. The increase in molecular weight is measured as an increase in solution viscosity.

A paper strengthening agent made by glyoxalation of a cationic acrylamide polymer with a molecular weight in the range of 500 to 6000 is taught by U.S. Pat. No. 4,605,702. This patent alleges improved loss of wet strength over time compared to previous disclosures. A viscometer is used to measure the increase in the solution viscosity as the glyoxalation reaction progresses.

A glyoxalated-polyvinylamide which is alleged to have enhanced storage stability resulting from multiple additions of glyoxal and the addition of an aldehyde scavenger is taught in U.S. Publication No. 20050187356. The backbone polymer is glyoxalated at a pH of 8 until the viscosity reaches 12 cps, at which time the reaction pH is lowered to 7.1 to 7.2. The reaction continues at a moderate rate until a viscosity of 54 cps is reached, at which time the reaction is quenched by addition of sulfuric acid to lower the pH to about 3.5.

PCT Published Application No. 2006/016906 describes a cationic vinylamide crosslinked polymer which is treated with a cellulose reactive agent such as glyoxal to impart strength to paper.

U.S. Pat. Nos. 4,954,538, 5,041,503 and 5,320,711 teach microparticles of cross linkable, glyoxalated-polyvinylamide prepared by reverse phase microemulsion polymerization and describe adding glyoxal to the micro emulsion polymer to form a glyoxalated polymer.

The methods and products described above have clear disadvantages. The aqueous glyoxalated-polyvinylamide adduct formation described in the known art is monitored by following the increase in solution viscosity as the reaction progresses. If the reaction is allowed to move forward unimpeded, a water-insoluble gel will ultimately form. Glyoxalated microemulsions (U.S. Pat. Nos. 4,954,538, 5,041,503 and 5,320,711) contain significant organic carrier oils which are costly and give high volatile organic compounds (VOC). There are numerous applications where high VOC amounts restrict use.

The various glyoxalated-polyvinylamide adducts commercially available at present are commonly known to have an approximate shelf-life range of about four to six weeks, depending on the pH, concentration of the adduct polymer solution and temperature at the time of storage.

When the desired extent of glyoxalation is reached, approximately half of the original glyoxal remains unreacted in the finished product and does not function as a strength aid.

The inventor has discovered that unexpectedly, improved adducts are formed by the aqueous reaction of glyoxal and vinylamide polymer when the concentration of the vinylamide polymer during the reaction is close to a Critical Concentration which determines an inflection point(s) defined below.

Furthermore, the adducts formed by the inventive method are not limited by the constraints of poor storage stability, do not run the risk of gelation, contain less unconsumed glyoxal than products of prior processes and contain essentially no oils. Additionally, the glyoxalated vinylamides of the present invention impart improved wet and dry strengthening efficiency to paper and paperboard, when compared to adducts disclosed in previously described art.

SUMMARY OF THE INVENTION

The present invention relates to a novel method for preparing thermosetting cellulose reactive polyvinylamide adduct. Specifically the invention encompasses:

a method for preparing a cellulose reactive functionalized polyvinylamide adduct comprising reacting a substantially aqueous reaction mixture of a vinylamide polymer and a cellulose reactive agent to form the adduct.

The concentration of the vinylamide polymer for the above reaction mixture is defined variously as below:

the concentration of the vinylamide polymer is below, equal to or no more than 1 percentage points (1%) above a Critical Concentration of the reaction mixture. At concentrations above the Critical Concentration, the viscosity of the reaction mixture increases with the forward progress of adduct formation, and at concentrations below the Critical Concentration, the viscosity of the reaction mixture decreases with the forward progress of adduct formation.

For clarity, what is meant by about 1% of the reaction mixture above a Critical Concentration is for example, if the Critical Concentration is 5 wt. %, then 1% above would mean 6 wt. %.

Secondly, the concentration of the vinylamide polymer may be defined as less than about 5 wt. % of the reaction mixture at any stage during the catalyzed adduct reaction. For example, the concentration of the vinylamide polymer may be defined as less than about 4 wt. % of the reaction mixture at 10, 20, 30, 40 or 50% of completion of the glyoxalation reaction. For example, the concentration of the vinylamide polymer may be approximately 10 wt. % at onset, then diluted to less than 4 wt. % at 10% completion of the glyoxalation reaction.

It is preferred that the concentration be less than about 4 wt. % at the onset of functionalization of the vinylamide polymer.

Thus a substantially aqueous glyoxalated-polyvinylamide thermosetting polymer composition comprises a reaction product of a vinylamide polymer and glyoxal wherein the vinylamide polymer has an average molecular weight of at least about 30,000 to at least about 500,000 or even as high a molecular weight as 5,000,000. For example, the molecular weight may be at least about 50,000, 70,000, 100,000 or higher. Generally, at least 40 wt. % of the total glyoxal, and preferably more than 50% of the glyoxal has been consumed during the reaction and the reaction contains substantially no organic liquid. The molar ratio of the amide functionality on the vinylamide polymer and glyoxal during the reaction is between 2 to 1 and 12 to 1, and the reaction is catalyzed to a point where at least 40% of the cellulose reactive agent is consumed in the reaction. Preferably the molar ratio of vinylamide polymer to cellulose reactive agent is between 3 to 1 and 8 to 1, and at least 50% of the cellulose reactive agent is consumed in the catalyzed reaction.

Alternatively, the reaction mixture has a pre-reaction viscosity and a second viscosity which is measured once the reaction has progressed to a point where at least 50 wt. % of the total cellulose reactive agent has been consumed, and the difference between the pre-reaction and second viscosities is characterized by a viscosity decrease, no change in viscosity, or increase of less than about 50% of the pre-reaction viscosity. For example, if the pre-reaction viscosity (bulk viscosity) is 20 centipoise, the second viscosity will be no more than 30 centipoise.

The invention further embodies:

A method for increasing the wet or dry strength of paper or board comprising the steps of:
a) providing an aqueous slurry of cellulosic fibers;
b) adding the adduct obtained by the method according to the invention to the aqueous slurry;
c) forming a web from the aqueous slurry formed in step b); and
d) drying the web.

A method for increasing the wet or dry strength of paper or board may also be accomplished by means other than adding the adduct to the cellulosic slurry such as incorporation on the paper or board for example, comprising the steps of:
a) spraying, coating or otherwise applying the adduct obtained according to method of the invention onto a wet web, paper or board; and
b) drying the coated wet web, paper or board.

Compositional embodiments include:

a paper or board incorporating the adduct obtained by the methods above;

a glyoxylated-polyvinylamide thermosetting resin obtained by the methods above;

a substantially aqueous glyoxalated-polyvinylamide thermosetting polymer composition comprising a reaction product of a vinylamide polymer and glyoxal wherein the vinylamide polymer has a weight average molecular weight (Mw) of at least 25,000, preferably at least 30,000, most preferably at least 70,000 and the amount of glyoxal consumed in the catalyzed reaction is at least about 40 wt. %, and preferably more than 50 wt. % of the total glyoxal charged. The amide to glyoxal molar ratio is in the range of 2:1 to 12:1, and preferably in the range of 2.5 to 8:1. Further, the aqueous composition contains substantially no organic liquid.

DETAILED DESCRIPTION OF THE INVENTION

Definition of Basic Terms

For the purposes of the invention, the reaction of the pendant amide groups of vinylamide polymers with glyoxal will be referred to as a "glyoxalation reaction" or simply "glyoxalation", in this application. The product of said glyoxalation reaction will be referred to as glyoxalated-polyvinylamide or glyoxalated-polyvinylamide adduct or just plain adduct(s).

The term "vinylamide polymer" refers to the starting polymer before glyoxalation. It may be a homopolymer, copolymer or terpolymer. The starting vinylamide polymer or formed vinylamide polymer adduct may be cationic, potentially cationic, anionic, potentially anionic, nonionic or amphoteric. The starting vinylamide polymer may be a blend of vinylamide polymer and another miscible non-vinylamide polymer.

A copolymer for purposes of the invention is a polymer formed from two or more monomers.

The term "catalyzed glyoxalation reaction" refers to a glyoxalation reaction carried out in an environment such that physical or chemical conditions cause the reaction to progress at a moderate to accelerated rate, wherein the desired reaction is obtained in less than about 12 hours, or more preferably in less than 6 hours, less than 3 hours or even less than about 1 hour. Preferably the glyoxalation is effected under alkaline conditions or by addition of a base or basic buffer.

The term "substantially aqueous reaction mixture" for the purposes of the invention means that the adduct formation is carried out substantially in the absence of organic oils. For example, it is known to glyoxalate a vinylamide polymer in an inverse micro-emulsion which comprises both an oil phase and a water phase. The oil phase comprises at least one hydrocarbon. Typically the oil phase will be mineral oil, toluene, fuel oil, kerosene, odorless mineral spirits, or mixtures of the like. The weight of oil in these prior art processes often exceeds the weight of polymer formed. Thus for the purposes of the invention, adduct formation is carried out in a "substantially aqueous reaction mixture" wherein the presence of organic oils does not exceed the weight of vinylamide polymer, preferably oil weight does not exceed 50 wt. % of the vinylamide polymer and most preferably there is no significant amount of oil present during the adduct formation. Substantially aqueous means oil makes up less than about 20 wt. % of the vinylamide polymer and preferably less than 10, or less than about 5 or less than about 1 wt. %.

The wt. % of the vinylamide polymer is based on the total weight of the reaction mixture.

Wt. % Glyoxal consumed is based on total weight of glyoxal charged.

Molecular weight for purposes of the invention means weight average molecular weight ($M_w$).

Molecular weight is determined by standard methods such as GPC. For example, the average molecular weight may be determined by conventional calibration techniques using acetate buffer and the following columns: TSK PWXL (Guard+G6000+G3000). Polyethylene oxide and polyethylene glycol standards may be used to calibrate the column set.

Other materials which are soluble or miscible in water may additionally be present in the reaction mixture. Chelating agents, electrolytes such as sodium chloride, surfactant and polar solvents such as methanol may be present in the reaction mixture. Low molecular weight cationic polymers may also be present in the reaction mixture, for example polysaccharides, polydiallyldimethylammonium chloride (polyDADMAC) and polyamines. Inorganic cationic flocculants may also be present, such as ferric chloride, aluminum sulfate, polyaluminum chloride and aluminum chlorohydrate, etc.

The vinylamide polymer or formed adduct may be further combined with a second polymer (different than the vinylamide polymer) which may be cationic, anionic, non-ionic or amphoteric. For example the glyoxalated polyvinylamide polymer may be combined with a polyamine or polyaminopolyamide epichlorohydrin (PAE).

For example, the second polymer may be cationic and formed from cationic or potentially cationic monomers described herein. The second polymer may be a Mannich base, polyamine, polyethyleneimine, polyamidoamine/epichlorohydrins, polyamine epichlorohydrin products, dicyandiamide polymers including polyamine-dicyandiamide and polydicyandiamide formaldehyde polymers, or cationic starch. Additional examples might be polyamine-epihalohydrin resins, such as polyaminopolyamide-epihalohydrin resins which are also cationic thermosetting materials used to increase the wet strength of papers.

Vinylamide

The term vinylamide refers to any vinyl monomer containing an amide functionality including but not limited to acrylamide, methacrylamide, N-methyl acrylamide or any other substituted acrylamide.

Synthesis of Backbone Vinylamide Polymer

The backbone vinylamide polymers, which are subsequently glyoxalated by the process of the invention, may be synthesized by free radical or redox catalysis polymerization of a vinylamide monomer, and optionally one or more ionic comonomer(s) or nonionic comonomers. Cross-linking agents with multiple polymerizable vinyl functionalities can also be included in the formulations to impart structure to the backbone polymer. A chain transfer agent, such as sodium hypophosphite, may be used to control the molecular weight of the polymer molecules, as well as to introduce branching.

The water soluble vinylamide polymer may be formed by any suitable polymerisation process. The polymers may be prepared for instance as gel polymers by solution polymerisation, water-in-oil suspension polymerisation or by water-in-oil emulsion polymerisation. The polymers may be produced as beads by suspension polymerisation or as a water-in-oil emulsion or dispersion by water-in-oil emulsion polymerisation, for example according to a process defined by EP-A-150933, EP-A-102760 or EP-A-126528.

Alternatively the water soluble polymer may be provided as a dispersion in an aqueous medium. This may for instance be a dispersion of polymer particles of at least 20 microns in an aqueous medium containing an equilibrating agent as given in EP-A-170394. This may for example also include aqueous dispersions of polymer particles prepared by the polymerisation of aqueous monomers in the presence of an aqueous medium containing dissolved low intrinsic viscosity polymers such as poly diallyl dimethyl ammonium chloride and optionally other dissolved materials for instance electrolyte and/or multi-hydroxy compounds e.g. polyalkylene glycols, as given in WO-A-9831749 or WO-A-9831748.

Molecular Weight, Structure and Composition of Vinylamide Polymer

The vinylamide polymers that are glyoxalated by the process of the invention can be of any molecular weight obtainable by methods of polymer synthesis known to those skilled in the art. The vinylamide polymer may be nonionic, cationic, anionic or amphoteric. The vinylamide polymer may be crosslinked or structured.

The average molecular weight of the vinylamide polymer may range from 500 to about 5,000,000 or even 10,000,000 Daltons.

The starting vinylamide polymer has an average molecular weight of at least 500, but preferably at least about 10,000 to about 5,000,000. For example, 50,000 to 2,000,000, 70,000 to 1,000,000 are envisioned. The process of the invention allows glyoxalation of vinylamide polymers of about 50,000 or greater, about 70,000 or greater and even about 85,000 or 100,000 or greater. Preferable average molecular weight ranges are for example between 5,000 to about 150,000, 10,000 to about 150,000 or 25,000 to about 150,000.

Suitable vinylamide monomers are (meth)acrylamide, $C_{1-4}$ mono substituted (meth)acrylamides such as N-methyl (meth)acrylamide, N-ethyl(meth)acrylamide. The most preferred vinyl monomers are acrylamide and methacrylamide.

The term (meth)acrylamides includes both acrylamide and methacrylamide.

The vinylamide content of the polymers of the present invention provides the sites to which the cellulose reactive agent or glyoxal substituents are attached. The minimum proportion of vinylamide units which should be present should be sufficient so that the glyoxalated polymer is thermosetting, such that the glyoxalated polymer forms a water-insoluble film when it is laid down from water solution on a glass plate and heated for 5 minutes at about 105° C.

Thus the vinylamide polymer (before glyoxalation) should be formed from at least about 10 wt. % vinylamide monomers. Preferably, the vinylamide polymer is formed from at least about 20 to about 100 wt. % vinylamide monomers. For example, the vinylamide polymer is at least formed from about 20 to about 99 wt %, at least about 25 to about 90 wt. % vinylamide monomers, or at least about 50 wt. % and most preferably at least about 70 wt % vinylamide monomers. The wt. % is based on the weight of the total weight of monomers charged to form the vinylamide polymer.

Once the monomers polymerize, they become incorporated units in the polymer.

Thus there may be units in the polymers of the present invention which may confer ionic properties upon the polymer, or those which act as diluents or spacers, or which confer special properties, for example, improved or diminished water-solubility.

Ionic comonomers, which can be used in conjunction with vinylamide monomers, can be cationic, potentially cationic, anionic, potentially anionic or amphoteric. When using cationic comonomers, one or more cationic monomers can be used, and the total amount of cationic monomer should be such that a glyoxal adduct of the vinylamide copolymer is self-substantive to cellulose fibers in aqueous suspension.

Cationic comonomers are especially preferred as the cationic charge gives substantivity to cellulose fiber.

Suitable cationic monomers or potentially cationic monomers include diallyldialkyl amines, 2-vinylpyridine, 2-(dialkylamino)alkyl(meth)acrylates, dialkylamino alkyl(meth)acrylamides, including acid addition and quaternary ammonium salts thereof. Specific examples of such cationic monomers or potentially cationic monomers are diallyldimethyl ammonium chloride, (meth)acryloyloxy ethyl trimethylammonium chloride (dimethyl amino ethyl (meth)acrylate, methyl chloride quaternary salt), 2-vinyl-N-methylpyridinium chloride, (p-vinylphenyl)-trimethylammonium chloride, (meth)acrylate 2-ethyltrimethylammonium chloride, 1-methacryloyl-4-methyl piperazine, Mannich poly acrylamides i.e. polyacrylamide reacted with dimethyl amine formaldehyde adduct to give the N-(dimethyl amino methyl) and (meth)acrylamido propyltrimethyl ammonium chloride.

Potentially cationic monomers may be for example monomers that give a cationic charge under acidic conditions such as when an amine functionality on the potentially cationic monomer is protonated.

The amount of cationic comonomer may range from about 0% to about 90 wt. %, about 0.1 to about 50 wt %, about 0.1 to about 40, about 0.1 to about 30, about 0.1 to about 25 wt % or about 0.1 to about 15 or about 10 wt. percent. The wt. % is based on the total weight of monomer(s) charged to form the vinylamide polymer.

Furthermore, the vinylamide monomers may be copolymerized with vinyl tertiary amines such as dimethylaminoethyl acrylate or vinylpyridine. The tertiary amine groups can then be converted into quaternary ammonium groups by reaction with methyl chloride, dimethyl sulfate, or benzyl chloride to produce a cationic polymer. Moreover, polyacrylamide can be rendered partially cationic by reaction with glycidyl dimethyl ammonium chloride.

Suitable anionic monomers may be selected from vinyl acidic material such as acrylic acid, methacrylic acid, maleic acid, allyl sulfonic acid, vinyl sulfonic acid, itaconic acid, fumaric acid, potentially anionic monomers such as maleic anhydride and itaconic anhydride and their alkali metal and ammonium salts, 2-acrylamido-2-methyl-propanesulfonic acid and its salts, sodium styrene sulfonate and the like. Alternatively, if the starting vinylamide polymer is polyacrylamide, it may be partially hydrolysed to achieve some anionic character then functionalized with the cellulose reactive agent.

Potentially anionic monomers may be for example acrylamide, which when partially hydrolysed forms an acid which may give anionic character to the polymer under basic conditions. Alternatively, the potentially anionic monomers may be for instance an anhydride monomer, such as maleic anhydride or itaconic anhydride, which can be hydrolysed to form the corresponding acid.

As stated above, the vinylamide polymer may be amphoteric; that is the polymer may include anionic and cationic functionality. The amphoteric vinylamide polymer may be formed from both anionic and cationic monomers or alternatively from zwitterionic monomers. The various monomers (anionic, cationic and/or zwitterionic) may be reacted in any wt. ratio to form the amphoteric vinylamide polymer. It is preferable that the predominate charge on the formed amphoteric vinylamide polymer be cationic. Thus, the mole % of cationic monomer dominates over the mole % anionic monomer incorporated into the amphoteric vinylamide polymer.

Suitable non-ionic monomers other than the vinylamide may be selected from the group consisting of (meth) acrylic esters such as octadecyl(meth)acrylate, ethyl acrylate, butyl acrylate, methylmethacrylate, hydroxyethyl(meth)acrylate and 2-ethylhexylacrylate; N-alkyl acrylamides, N-octyl (meth)acrylamide, N-tert-butyl acrylamide, N-vinylpyrrolidone, N,N-dialkyl(meth)acrylamides such as N,N'-dimethyl acrylamide; styrene, vinyl acetate, hydroxy alkyl acrylates and methacrylate such as 2-hydroxy ethyl acrylate and acrylonitrile.

The starting vinylamide polymer or formed vinylamide polymer adduct may be crosslinked, branched or otherwise structured or linear. For example, the starting vinylamide polymer or formed vinylamide polymer adduct may be linear, crosslinked, chain-transferred, or crosslinked & chain-transferred (structured).

Cross linking agents are usually polyethylenically unsaturated crosslinking agents. Examples are methylene bis (meth)acrylamide, triallylammonium chloride; tetraallyl ammonium chloride, polyethyleneglycol diacrylate; polyethyleneglycol dimethacrylate; N-vinyl acrylamide; divinylbenzene; tetra(ethyleneglycol)diacrylate; dimethylallylaminoethylacrylate ammonium chloride; diallyloxyacetic acid, Na salt; diallyloctylamide; trimethyllpropane ethoxylate triacrylate; N-allylacrylamide N- methylallylacrylamide, pentaerythritol triacrylate and combinations thereof. Other systems for crosslinking can be used instead of or in addition to this. For instance covalent crosslinking through pendant groups can be achieved, for instance by the use of ethylenically unsaturated epoxy or silane monomers, or by the use of polyfunctional crosslinking agents such as silanes, epoxies, polyvalent metal compounds or other known crosslinking systems.

Chain transfer agents may be used to synthesize the starting vinylamide polymer. Suitable chain transfer agents are 2-mercaptoethanol; low molecular weight organic acids such as lactic acid, formic acid, malic acid or butyric acid; isopropyl alcohol; thioacids and hypophosphites.

Cellulose Reactive Agent

The cellulose reactive agent will comprise more than one aldehyde functionality.

The cellulose reactive reagents are selected from the group consisting of glyoxal, glutaraldehyde, furan dialdehyde, 2-hyroxyadipaldehyde, succinaldehyde, dialdehyde starch, diepoxy compounds, and combinations thereof.

Glyoxal is the preferred cellulose reactive reagent.

The molar ratio of amide (on the vinylamide polymer) to cellulose reactive agent will vary from about 12:1 to about 2:1, for example, about 10:1 to about 2.5:1, about 6:1 to about 2.5:1 and about 6:1 to about 3:1.

The molar content of amide on the vinylamide polymer may be determined experimentally by methods well known in the art or calculated from the known monomer composition.

Reaction Conditions

Base Addition

Base addition or changing the pH to above 7 is the most common method of catalyzing the glyoxalation reaction. Preferably, a pH range of 7 to 13 is generally considered to be a catalytic environment for the reaction. For example, a pH range of 8 to 12 is especially appropriate.

Alternatively, a concentrated pH buffer solution may be added to maintain pH.

Concentration of the Vinylamide Polymer

For purposes of the invention, the concentration of vinylamide polymer refers to the polymeric vinylamide before reaction with the cellulose reactive agent or before glyoxalation.

The vinylamide polymer may be formed before glyoxalation.

The process of this invention has been developed to incorporate and take advantage of unexpected rheological behavior observed in vinylamide glyoxalation reactions when the vinylamide polymer concentrations of the catalyzed reaction mixtures are within particular ranges. One important advantage stemming from the process of the invention is that cellulose reactive adducts can be formed from starting vinylamide polymers of significantly higher Mw than those enabled by the processes for making cellulose reactive adducts disclosed in the prior art.

Moreover, a Critical Concentration exists for any given vinylamide polymer, and the Critical Concentration of a vinylamide polymer coincides with an inflection point in the rheological behavior of a solution of that vinylamide polymer during the glyoxalation reaction. This rheological inflection point can be defined as the point on a plot of vinylamide polymer concentration versus change in reaction mixture viscosity resulting from glyoxalation. The inflection point, and therefore the Critical Concentration, is the theoretical point at which the slope of the plot line reverses direction.

The Critical Concentration for glyoxalation of a particular vinylamide polymer is determined through empirical studies involving glyoxalation of the vinylamide polymer. Multiple glyoxalations of the vinylamide polymer should be carried out in a number of independent reaction solutions, wherein each solution has a known and different vinylamide polymer concentration which is expressed as a wt. % of the total reaction mixture. The rheological behavior or change in viscosity of a reaction mixture is measured as the glyoxalation reaction proceeds, and this change in viscosity can be either a continued increase in viscosity or a continued decrease in viscosity as the reaction proceeds, or even no significant change in viscosity as the reaction proceeds. If the viscosity trend increases as the reaction proceeds, then the concentration of vinylamide polymer in the reaction mixture is said to be above the Critical Concentration for that vinylamide polymer. If the viscosity trend decreases as the reaction proceeds, then the concentration of the vinylamide polymer in the reaction mixture is below the Critical Concentration for that vinylamide polymer. If no significant change in viscosity is measured as the reaction proceeds, then the concentration of vinylamide polymer in the reaction solution is at or very near the Critical Concentration of that vinylamide polymer.

When attempting to ascertain an empirically derived value of the Critical Concentration of a particular vinylamide polymer, it is helpful for an experimenter to understand that the magnitude of the viscosity change versus reaction extent of various reaction mixtures decrease as the actual vinylamide polymer concentrations become more proximate to the theoretical Critical Concentration for that particular vinylamide polymer.

The Critical Concentration of a particular vinylamide polymer is strongly influenced by the vinylamide polymer molecular weight, and is therefore specific for vinylamide polymers with specific molecular weights, and with other equivalent characteristics. Other factors including but not limited to cross-linking, branching or other structuring, monomer composition, polymer ionicity and reaction solution ionic strength also affect the Critical Concentration.

However, molecular weight has by far the most profound impact on the value of the Critical Concentration. When considering a specific vinylamide polymer composition with all variables held constant except for molecular weight, the plot of the reaction mixture vinylamide polymer concentration versus molecular weight depicts an inversely proportional relationship between molecular weight and Critical Concentration. As the molecular weight of vinylamide polymers is increased, the value of the Critical Concentration decreases.

The Critical Concentration can therefore vary considerably between vinylamide polymers of differing average molecular weights. For example, the Critical Concentration may vary from 0.2% to about 4.5 wt. % of the vinylamide polymer, about 0.3 wt. % to less than 4.0 wt. %, about 0.5 to about 3.5 or 1.0 to about 3.0 or about 1.5 to about 2.5 wt. % of the vinylamide polymer. Vinylamide polymers with the highest efficiency for developing strength in paper have been found to have Critical Concentrations in the range of about 1.0% to about 3.0%.

As an example of how the Critical Concentration varies with the weight average molecular weight of vinylamide polymers, and considering specific vinylamide polymers composed of 90 weight percent acrylamide and 10 weight percent diallyldimethylammonium chloride (DADMAC), and with no compounds present in the reaction mixture other than the vinylamide polymer, glyoxal, deionized water and a catalytic quantity of sodium hydroxide; a polymer with a Mw of approximately 4,000,000 has a Critical Concentration of about 0.35 wt. % of the reaction mixture, and a polymer with a Mw of approximately 13,000 has a Critical Concentration of about 3.5 wt. % of the reaction mixture.

Compositional and process related advantages have been found when operating glyoxalation processes at or below the Critical Concentration. It is also possible to realize the advantages of the process when the vinylamide polymer concentration is slightly above the Critical Concentration. For example, the concentration can be about 1 percentage points above the Critical Concentration and the glyoxyalated polyvinylamides adduct produced will benefit from more efficient consumption of the glyoxal reactant and better performance on paper, when compared to those adducts produced at higher concentrations known previously (typically 8 to 12 wt. %).

One of the advantages of the process of the invention is the ability to glyoxalate relatively high average molecular weight vinylamide polymer without premature gelling of the glyoxalated adduct. For example, most of literature exemplifies glyoxalation reactions wherein the starting vinylamide polymer has an average molecular weight ranging from 5,000 to about 10,000 at concentrations of vinylamide polymer that range from 8 to 12 wt. %. At these concentrations (8-12) the glyoxalation reaction of a relatively high molecular weight of the starting vinylamide polymer (=>25,000) will prematurely gel causing incomplete glyoxalation of the starting polymer and generating an insoluble gel. By using the process of the invention, a means is now available to glyoxalate a relatively high molecular weight (=>25,000) starting polyvinylamide which in turn gives better performance on paper or board.

Subjecting various samples of glyoxalated polyacrylamide to conditions that break aldehyde-amide bonds allows one to determine the Mw of the starting or "backbone" polymer. This can be done by subjecting the glyoxalated vinylamide polymer to basic conditions for a period of time.

Within the scope of the invention, the concentration of the vinylamide polymer can vary considerably, for example less than 4 wt. %, about 0.1 to less than 4, less than 3.5, 0.5 to about 3.5 wt. % of the vinylamide polymer, about 1.0 to about 3.5 or 1.0 to about 3.0 or about 1.5 to about 3.0 wt. % of the vinylamide polymer.

Furthermore, it has been discovered that the Critical Concentration of the vinylamide polymer is generally at or less than 5.0 weight percent the vinylamide polymer based on the total weight of glyoxalation reaction solution when the molecular weight is above 2000.

Further examples will illustrate the relationship between the Critical Concentration of vinylamide polymer vs. weight average molecular weight.

A vinylamide polymer of molecular weight ranging from about 1,000,000 to about 4,000,000 will give show a Critical Concentration which will vary from 1.0 to about 0.2 wt. %; a molecular weight ranging from about 25,000 to about 175,000 will show a Critical Concentration which will vary from about 2.5 to about 1.1 wt. %; and a molecular weight ranging from about 2,000 to about 15,000 will vary from about 5.0 to about 3.5 wt. %.

Percent Glyoxal Consumed

Prior processes which are run in substantially aqueous environments have not been able to achieve efficient use of the glyoxal reactant, and typically consume only about 50 wt. % of the total glyoxal charged.

The glyoxal consumed is determined by measuring the residual glyoxal (unbound glyoxal) remaining in the glyoxalation reaction mixture. The reaction is continued until at least about 50 wt. % of the total glyoxal has been consumed, and the reaction may also be usefully continued until as much as 90 or more weight % of the total glyoxal is consumed in the reaction. The method of analysis is described in the Examples section.

Furthermore, a procedure for determining the amount of bound glyoxal in the glyoxalated vinylamide polymer adduct is described in Analytical Biochemistry, Vol. 81, pp. 47-56.

Glyoxal consumption is at least about 40 wt. % or even at least 60, 65, 75, 85 or 90 wt. % of the reactant glyoxal during the catalyzed reaction event.

Reactant glyoxal is the amount of total glyoxal charged before, during or after the catalyzed reaction.

Glyoxal may be charged in any number of increments before or during the reaction.

Monitoring of Adduct Formation

In prior art processes, adduct formation between vinylamide polymer and glyoxal is monitored by measuring the viscosity of the reaction over time. Once a certain increase in viscosity is achieved for a particular vinylamide polymer, the reaction is quenched by dilution and/or addition of acid.

However, the process according to the present invention shows only a very moderate increase in viscosity, a slight decrease in viscosity, or no increase at all. The inventor has observed that as the glyoxalation of the vinylamide polymer proceeds during the method of the invention, the turbidity of the reaction solution increases. Thus the present method of the invention may follow the glyoxalation reaction with a turbidimeter or a viscometer.

Therefore, adduct formation may be determined by measuring the change in turbidity or viscosity of the aqueous reaction at the start of the reaction or $T_0$ and at a predetermined endpoint $T_e$ ($T_e$-$T_0$).

The predetermined endpoint is for example, a desired increase in turbidity (measure of glyoxalation) for a particular vinylamide polymer. Thus, for example, a vinylamide polymer of 100,000 average molecular weight may give a turbidity of 0 to 5 NTU (nephelometric units) at the beginning of the reaction ($T_0$) and a turbidity change of between 2 to 1000 NTU at the predetermined endpoint. Once the turbidity of the reaction mixture has increase by about 2 to 1000 NTUs the reaction can be quenched to prevent further reaction.

Turbidity measurements are especially important when the reaction takes place at or below the Critical Concentration.

Viscometers and turbidimeters are well known in the art. For example SURFACE SCATTER 7SC turbidimeter is a continuous-monitoring instrument designed for measuring turbidity in fluids. The instrument design is based on the nephelometric principle, where light scattered by particles suspended in the fluid is measured to determine the relative amount of particulate matter in the fluid.

In processes of the invention where a viscosity change occurs, (increase or decrease) the extent of reaction may be monitored by the change in viscosity.

Viscosity is typically measured during the reaction using the UL adapter for a BROOKFIELD LV series viscometer. The UL adapter has no spindle number. Only one setting is possible. The base of the adapter cup is removed and the assembly is placed directly into the reaction mixture. Viscosity measurements are automatically recorded every second during the length of the catalyzed reaction. The viscometer is set to a speed of 60 rpm and the temperature of the reaction mixture is maintained at 25° C.

Batch or Continuous Mode

The cellulose reactive polyvinylamide polymers may be synthesized in a batch or continuous mode. The process of the invention is particularly favorable for implementation in a continuous reactor with pH measurement capability at the papermaking site.

The continuous reactor may be a tubular reactor.

Other variables which affect the rate of glyoxalation include, but are not limited to, pH, temperature, vinylamide polymer molecular weight, reaction mixture concentration, molar ratio between vinylamide polymer and glyoxal, molar amide constituency of the vinylamide polymer, and the presence of substances which interfere with the reaction.

The reaction is normally run at ambient temperatures. However the reaction may be carried out by the process of the invention over a wide temperature range.

The length of the reaction will vary depending on concentration, temperature and pH, as well as other factors.

Other conventional additives which may be added to the glyoxalation reaction are chelating agents to remove polymerization inhibitors, pH adjusters, initiators, buffers, surfactants and other conventional additives.

Application of Vinylamide Polymer Adduct

The polymers made by the process of the invention may be used in the manufacture of paper as dilute aqueous solutions. The aqueous solutions can be applied to preformed paper by the tub or impregnation method, or by adding the solutions directly to paper-making fibrous suspensions at any point in the paper-making process where wet- and dry-strength resins are ordinarily applied.

The cellulose reactive polyvinylamide adducts of the invention may be applied or incorporated in the wet-end of the papermaking process or applied to the wet paper.

The glyoxalated adduct may be added in the thick or thin stock. When added to the thin stock it may be added before the fan pump.

A substantial amount of wet- or dry-strength is imparted when as little as about 0.05 wt. % of the glyoxalated polyvinylamide, based on dry fiber weight of the furnish is added to the furnish.

For example, dosages of about 0.1 to about 20 (0.05-10 kg/metric ton) pounds dry polymer per ton of dry furnish, about 1 to about 12, (0.5-6 kg/metric ton) about 1 to about 9 (0.5-4.5 kg/metric ton), about 1 to about 8 (0.5-4 kg/metric ton) pounds dry polymer per ton of dry furnish is envisioned. More typically ranges of 1.5 to about 6 (1.0-3 kg/metric ton) pounds dry polymer per ton of dry furnish are envisioned.

Application of the adduct to wet paper or board may be accomplished by any conventional means. Examples include but are not limited to size press, padding, spraying, immersing, printing or curtain coating.

The polymers of the invention are absorbed by the papermaking fibers at pH values ranging from about 3.5 to about 8.

The following examples describe certain embodiments of this invention, but the invention is not limited thereto.

EXAMPLES

Determination of the Critical Concentration for Polyvinylamides of Varying Mw

A set of seven compositionally equivalent vinylamide polymers are synthesized with varying weight average molecular weights. The seven polymers are all copolymers of 90 weight percent acrylamide and 10 weight percent DAD-MAC. The weight average molecular weights of these seven polymers are shown in the table below.

Samples A, B, C and D are synthesized by heterogeneous suspension polymerization, and samples E, F and G are synthesized by aqueous solution polymerization.

Average molecular weight is determined for samples A and B using a DAWN multi-angle light scattering detector in combination with a differential refractive index detector. In the light scattering experiment, the amount of light scattered at a given angle is directly proportional to the weight average molar mass and the concentration. A second order Zimm plot is used to generate molar mass data with a do/dc (specific refractive index increment) value of 0.1800 (angles 4-15).

For samples C thru G the average molecular weight is determined by conventional calibration techniques using acetate buffer and the following columns: TSK PWXL (Guard+G6000+G3000). Polyethylene oxide and polyethylene glycol standards are used to calibrate the column set.

TABLE 1

| Vinylamide Polymer Mw | | | | | | |
|---|---|---|---|---|---|---|
| Sample | | | | | | |
| A | B | C | D | E | F | G |
| Mw 3.93 MM | 1.36 MM | 585M | 331M | 140M | 64M | 13M |

Glyoxalation at Different Concentrations to Determine Critical Concentration

Three separate aqueous reaction mixtures of each of the three vinylamide polymers, "B", "E" and "G" are made at concentrations in close proximity to the anticipated Critical Concentration for each of the polymers. Enough glyoxal is added to each of the nine polymer solutions such that a 4:1 amide:glyoxal molar ratio is established for each. For each polymer solution, 5 wt. % aqueous solution of sodium hydroxide is added dropwise and continued until the pH of the solution reaches 9.2. Small additions of sodium hydroxide are administered as needed to maintain a nearly constant pH of 9.2 for 30 minutes. At 5 minute intervals during the 30 minute reaction time, including time zero, 20 ml samples are collected from the reaction beakers and immediately quenched by lowering the pH to 4.0 with dilute sulfuric acid. In all, seven samples are collected for each polymer reaction mixture. The viscosity of the seven samples from each reaction mixture is measured using a Type 2 SCHOTT suspended level viscometer, and is reported in centistokes.

In the case of all three polymers the results in Table 2 show that the Critical Concentration lies between two of the three tested concentrations.

TABLE 2

| Sample | Sample B | | | Sample E | | | Sample G | | |
|---|---|---|---|---|---|---|---|---|---|
| # | 0.60% | 0.80% | 1.60% | 1.25% | 1.50% | 1.75% | 3.2% | 3.6% | 4.0% |
| 1 | 3.25 | 5.12 | Gelled* | 2.11 | 2.30 | 2.65 | 1.75 | 1.81 | 1.94 |
| 2 | 2.67 | 5.10 | — | 2.11 | 2.25 | 2.72 | 1.75 | 1.84 | 2.14 |
| 3 | 2.62 | 5.22 | — | 2.04 | 2.23 | 2.81 | 1.73 | 1.85 | 2.17 |
| 4 | 2.60 | 5.28 | — | 1.98 | 2.22 | 2.93 | 1.71 | 1.87 | 2.23 |
| 5 | 2.56 | 5.34 | — | 1.87 | 2.19 | 3.05 | 1.70 | 1.87 | 2.31 |
| 6 | 2.43 | 5.81 | — | 1.81 | 2.19 | 3.17 | 1.69 | 1.87 | 2.32 |
| 7 | 2.35 | 6.58 | — | 1.74 | 2.16 | 3.26 | 1.67 | 1.88 | 2.38 |

*At a concentration of 1.6% the reaction mixture of Sample B gels before a sample can be collected and quenched.

The Critical Concentration for:
Sample B lies between 0.6 and 0.8%;
Sample E lies between 1.50 and 1.75%;
Sample G lies between 3.20 and 3.6% vinylamide polymer concentration based on the total weight of the reaction mixture.

Samples of the glyoxalated vinylamide polymers "B", "E" and "G", which are glyoxalated by the above described process of the invention, at aqueous vinylamide polymer concentrations of 0.6%, 1.25% and 3.2% (all below the Critical Concentration) respectively, are tested for dry strengthening efficiency. A commercially available glyoxalated-polyvinylamide product is included in the analysis as a reference point. The results in Table 3 show the dry strengthening efficiency of each adduct when added at a rate of 6 dry pounds of adduct per dry ton of paper (3 kg/metric ton).

The cellulose substrate used for the testing is obtained from a linerboard machine with a 100% post-consumer stock stream. Handsheets of 140 grams per square meter weight are prepared for this testing.

TABLE 3

| Tensile Strength Results | | | | |
|---|---|---|---|---|
| | Additive | | | |
| | None | Adduct of "B" | Adduct of "E" | Adduct of "G" | Commercial Product* |
| Load in Kg | 8.55 | 8.59 | 9.34 | 9.14 | 8.99 |

*The Commercial Product has a Mw of approximately 10,000 and a glyoxal to amide molar ratio of about 1 to about 2.5.

Comparison Examples

The glyoxalation procedure of example 1 from U.S. Pat. No. 3,556,932 is followed. The vinylamide polymer is a Mw of 10,000. The backbone polymer is 91 wt. % acrylamide and 9 wt. % diallyldimethylammonium chloride. A sample labeled as "1" is removed from the reaction mixture after the viscosity reaches a level of "C" (a Gardner-Holdt viscosity of C as an 11% by weight solution at 30° C. on the bubble viscometer scale, and the pH of the sample is lowered to 3.5 to quench the reaction. The reaction mixture is allowed to react further until gellation occurred. A sample of the gelled material, labeled as "2" is processed in a lab blender to liquefy the sample, and the sample is quenched to a pH of 3.5. The sample labeled as "1" is considered a sample made by prior art technology, and the sample labeled as "2" is considered the absolute limit of practical glyoxal reaction achievable by the prior art technique, as this sample has reached the gellation point.

The glyoxalation process of the invention is run at a concentration of 2.0% solids on the same backbone polymer used in the comparison example above.

From the inventive glyoxalation process, a sample labeled as "3" is collected and quenched to a pH of 3.5, after having reacted to a turbidity level of 25 NTUs.

NTU units are determined using HACH 2100P turbidimeter.

Determination of Percent Glyoxal Consumed

All samples are adjusted to 2.0% concentration before analysis for residual glyoxal, and based on this 2% solids each sample "1", "2" and "3" contain an equivalent quantity of glyoxal before onset of the glyoxalation reaction.

The commercially available glyoxalated polyvinylamide is included with the other samples for analysis of residual glyoxal. As this is a commercial sample, the inventors do not know the actual amount of glyoxal added to this product prior to the glyoxalation reaction. Thus no % glyoxal reacted can be determined.

Percent residual glyoxal is determined from 2 wt. % aqueous solutions of the glyoxalated polyvinylamides. Residual glyoxal is removed from the glyoxalated polymer by dialysis through a 3500 MWCO membrane tubing. Ten mls of dialyzed sample is derivatized by adding 2.0 ml of o-(2,3,4,5,6 Pentafluorobenzyl)-hydroxyamine hydrochloride (6.6 mgs/ml) for approximately 2 hours. The glyoxal is then extracted from the dialysis solution using 1:1 hexane-diethyl ether. Analysis of the extract is completed by gas chromatography on an HP 5890 GC #6 instrument using a DB 5 15 M 0.53 mm i.d 1.5 um df column. Once the residual glyoxal is determined and the amount of pre-reaction glyoxal is known, the percent glyoxal consumed may be calculated as below in Table 4.

TABLE 4

| Sample Label | Residual Glyoxal Detected (Wt. %) | Pre_Reaction Glyoxal (Wt. %) | Percent Reactant Glyoxal Consumed |
|---|---|---|---|
| "1" | 0.176 | 0.31 | 43.2% |
| "2" | 0.203 | 0.31 | 34.5% |
| "3" | 0.059 | 0.31 | 81.0% |
| Commercial Sample | 0.362 | Unknown | Unknown |

Sample "3" shows almost double the weight percent of glyoxal consumed as in sample "1".

The results in Table 5 show the dry strengthening efficiency of adducts "1" and "3" when added at a rate of 6 dry pounds of adduct per dry ton of paper (3 kg/metric ton). The cellulose substrate used for the testing is obtained from a linerboard machine with a 100% post-consumer stock stream. Handsheets of 140 grams per square meter weight were prepared for this testing.

TABLE 5

Tensile Strength Results

| | Additive | | |
|---|---|---|---|
| | None | Adduct of "1" | Adduct of "3" |
| Load in Kg | 8.55 | 8.98 | 9.18 |

Paper Machine Trial Comparisons

Example 1

A vinylamide polymer of Mw 100,000 formed from acrylamide and diallydimethylammonium chloride in a 90/10 weight ratio is glyoxalated according to the invention. The glyoxalation reaction is run at 2 wt. % solids with the vinylamide polymer concentration at approximately 1.7 wt. %. The amide:glyoxal molar ratio for the glyoxalation reaction is 4:1. The starting viscosity before glyoxalation is 4.05 cps The viscosity after glyoxalation is 4.75 cps The reaction is followed by monitoring turbidity. The starting turbidity is 4.4 NTU and final turbidity is 13.1 NTU.

Example 2

Example 2 is a glyoxalated polyvinylamide sold under the name BAYSTRENGTH 3000.

To demonstrate the effectiveness of the glyoxalated product produced by the process of the invention (example 5) with respect to known glyoxated vinylamide polymer (example 6), both products are applied as dry strength agents to the paper furnish and resulting properties of the paper examined in Table 6 below.

Paper is produced on a 2-ply fourdrinier with Bellbond (15% top ply: 85% bottom ply) at 2100 ft/min reel speed. The furnish is 80% virgin Kraft fiber and 20% OCC, 1% solids, a furnish charge of −350 milliequivalents per liter, a conductivity of 3000 microSeimens and a pH in the head-box of 5.1.

A glyoxalated vinylamide polymer formed by the process of the invention (example 1) and a conventionally glyoxalted vinylamide polymer (example 2 comparison) are separately added to the furnish in the thin stock before the fan pump. The glyoxalated adduct samples are applied at 1 lb/ton and 3 lb/ton for each (based on dry weight of furnish). Resulting paper is characterized by tensile strength, Ring crush, Concora measurements and Compression STFI.

Example 1 is a glyoxalated polyvinyl amide. The base polyvinyl amide before glyoxalation is ~100,000 average molecular weight and is formed from a 90/10 (wt. % based on total polymer weight) of acrylamide and diallydimethylammonium chloride.

The results in Table 6 compare paper properties using the product of the invention (example 1) and a known product (example 2).

TABLE 6

| | Ring Crush[1] | | MD Tensile[2] | | STFI[3] | | Concora[4] | |
|---|---|---|---|---|---|---|---|---|
| | Blank | | | | | | | |
| | 1.173 | | 1.247 | | 37.569 | | 1.592 | |
| Dosage | Ex. 1 | Ex. 2 | Ex. 1 | Ex. 2 | Ex. 1 | Ex. 2 | Ex. 1 | Ex. 2 |
| 1 lb/ton* | 1.246 | 1.209 | 1.379 | 1.331 | 39.611 | 38.501 | 1.756 | 1.679 |
| 3 lb/ton* | 1.266 | 1.254 | 1.384 | 1.377 | 38.319 | 38.304 | 1.895 | 1.732 |

[1]Ring Crush is determined using a MESSMER BÜCHEL CRUSH TESTER model K440 according to TAPPI T 822 method. Ring crush is a physical test of the paper's strength. (Higher is better)
[2]MD Tensil is determined using an INSTRON Model 5565 according to PATPAC D34 method.
[3]Compression STFI is determined using a MESSMER-BÜCHEL Model K455, according to TAPPI T 826 method.
[4]Concora is determined using a Medium Fluter Model No. JKB according to TAPPI T 809.

The product produced by the process of the invention gives more efficient gyoxalated polyacrylamide useage.

Example 3

Laboratory Technique for Determining Starting Molecular Weight of the Polyvinylamide Polymer The following experiment is aimed at subjecting various samples of glyoxalated polyacrylamide to conditions that break aldehyde-amide bonds and yield a polymer with the same Mw as the starting or "backbone" polymer.

A 91% acrylamide/9% DADMAC polymer (labeled as Sample A) of Mw=100,561 is used to form a glyoxalated adduct by the process of the invention. The polymer is diluted with water and glyoxal such that a 4 to 1 amide to glyoxal molar ratio is achieved, and the total solids of the reaction mixture is 2.0% The reaction is catalyzed by the addition of dilute sodium hydroxide to raise the solution pH to 9.5. The turbidity of the reaction solution is monitored, and after a net increase in turbidity of 50 NTU is achieved the reaction is quenched by the addition of enough sulfuric acid to lower the solution pH to 3.5. This formed adduct is labeled as Sample B.

To Sample B, enough dilute sodium hydroxide is added to raise the pH of the solution to 12.6, and the pH is maintained at this level for 30 minutes. After 30 minutes, the pH is returned to 3.5 by addition of dilute sulfuric acid, and this solution is labeled as Sample C. TABLE 7 give the Mw determinations for samples A thru C.

TABLE 7

| | Sample | | |
|---|---|---|---|
| | A | B | C |
| Mw* | 100,578 | 298,269 | 100,661 |

*Determined by standard GPC methods.

The results for Samples A, B and C above indicate that maintaining the pH of a glyoxalated adduct at 12.6 for 30 minutes causes the Mw of the adduct to revert back to that of the starting polymer prior to adduct formation.

A sample of glyoxalated polyacrylamide manufactured by a prior art process, and sold under the trade name of Raisabond Plus 7118, is labeled as Sample D. A portion of Sample D is mixed with water to form a solution with 2% solids. Dilute sodium hydroxide is added to the solution to increase the pH to 12.6. The pH is maintained at 12.6 for 30 minutes, after which the pH is lowered to 3.5 by the addition of dilute sulfuric acid. This solution is labeled as Sample E.

TABLE 8

| | Sample | |
|---|---|---|
| | D | E |
| Mw* | 347,937 | 10,503 |

*Determined by standard GPC methods.

The results for samples D and E indicate that the starting polymer Mw of Raisabond Plus 7118 is approximately 10,000.

The invention claimed is:

1. A method for preparing a cellulose reactive functionalized polyvinylamide adduct comprising
reacting a substantially aqueous reaction mixture comprising a vinylamide polymer and a cellulose reactive agent to form the adduct,
wherein the vinylamide polymer has an average molecular weight ranging from 70,000 to 500,000 Daltons and the concentration of the vinylamide polymer is less than about 4 weight percent of the reaction mixture at any stage during the adduct reaction, and
the adduct is characterized by a viscosity of no more than 30 centipoise measured using a BROOKFIELD viscometer at a speed of 60 rpm and a temperature of 25° C.

2. A method for preparing a cellulose reactive functionalized polyvinylamide adduct comprising
reacting a substantially aqueous reaction mixture comprising a vinylamide polymer and a cellulose reactive agent to form the adduct,
wherein a molar ratio of amide to cellulose reactive agent is in the range of about 2:1 to about 12:1, wherein the reaction mixture has a pre-reaction viscosity and a second viscosity and the second viscosity is measured once the reaction has progressed to a point where at least 50 wt. % of the total cellulose reactive agent has been consumed, and a difference between the pre-reaction and second viscosities is characterized by a viscosity decrease, no change in viscosity, or an increase of less than about 50% of the pre-reaction viscosity.

3. A Water-soluble glyoxalated-polyvinylamide thermosetting resin obtained by the method according to claim 1.

4. The method according to claim 1, wherein the cellulose reactive agent comprises more than one aldehyde functionality.

5. The method according to claim 1, wherein the cellulose reactive agent is selected from the group consisting of glyoxal, glutaraldehyde, furan dialdehyde, 2-hydroxyadipaldehyde, succinaldehyde, dialdehyde starch, diepoxy compounds, and combinations thereof.

6. The method according to claim 1, which further contains, in addition to the vinylamide polymer, a cationic polymer.

7. A paper or board incorporating the adduct obtained by the method according to claim 1.

8. A substantially aqueous glyoxalated-polyvinylamide thermosetting polymer composition, said composition comprising
a reaction product of a vinylamide polymer and glyoxal, wherein said composition contains substantially no organic liquid,
wherein the vinylamide polymer has an average molecular weight ranging from 70,000 to 500,000 Daltons and has a concentration ranging from about 0.1 to less than 4 wt. % based on the composition, and the reaction product is characterized by a viscosity of no more than 30 centipoise measured using a BROOKFIELD viscometer at a speed of 60 rpm and a temperature of 25° C.

9. The substantially aqueous glyoxalated-polyvinylamide thermosetting polymer composition according to claim 8, wherein a molar ratio of the amide functionality on the vinylamide polymer and glyoxal is between about 2 to 1 and about 12 to 1.

10. The substantially aqueous glyoxalated-polyvinylamide thermosetting polymer composition of claim 8, wherein the vinylamide polymer has an average molecular weight ranging from 75,000 to 500,000.

11. The substantially aqueous glyoxalated-polyvinylamide thermosetting polymer composition of claim 8, wherein the concentration of the vinylamide polymer ranges from about 0.5 to about 3%.

12. The substantially aqueous glyoxalated-polyvinylamide thermosetting polymer composition according to claim 8, which further includes a second polymer in addition to the glyoxalated-polyvinylamide.

13. The substantially aqueous glyoxalated-polyvinylamide thermosetting polymer composition of claim 8, wherein the vinylamide polymer is a homopolymer or copolymer formed from (meth)acrylamide or a substituted (meth)acrylamide.

14. The substantially aqueous glyoxalated-polyvinylamide thermosetting polymer composition of claim 8, wherein the vinylamide polymer is nonionic, cationic, potentially cationic, anionic, potentially anionic or amphoteric, or combinations thereof.

15. The substantially aqueous glyoxalated-polyvinylamide thermosetting polymer composition of claim 8, wherein the vinylamide polymer is cationic and is formed from a monomer or potentially cationic monomer,
which cationic monomer is selected from the group consisting of diallyldialkyl amines, (dialkylamino)alkyl (meth) acrylates, 2-vinylpyridines, (dialkylamino alkyl (meth) acrylamides, (p-vinylphenyl)-trimethylammonium chloride, and 1-methacryloyl-4-methyl piperazine including acid addition and quaternary ammonium salts thereof.

16. The substantially aqueous glyoxalated-polyvinylamide thermosetting polymer composition of claim 8, wherein the vinylamide polymer is formed from about 0.1 to about 40 weight percent of the (meth)acrylamide or a substituted (meth)acrylamide monomer.

17. The substantially aqueous glyoxalated-polyvinylamide thermosetting polymer composition of claim 8, wherein the vinylamide polymer is linear, crosslinked, chain-transferred, or crosslinked and chain-transferred.

18. The substantially aqueous glyoxalated-polyvinylamide thermosetting polymer composition of claim 8, wherein the vinylamide polymer is crosslinked using at least a difunctional monomer selected from the group consisting of methylene bis(meth)acrylamide; triallylammonium chloride; tetraallyl ammonium chloride; polyethyleneglycol diacrylate; polyethyleneglycol dimethacrylate; N-vinyl acrylamide; divinylbenzene; tetra (ethyleneglycol) diacrylate; dimethylallylaminoethylacrylate ammonium chloride; sodium salt of diallyloxyacetic acid; diallyloctylamide; trimethyllpropane ethoxylate triacryalte; N-allylacrylamide; N-methylailylacrylamide; pentaerythritol triacrylate, and combinations thereof.

* * * * *